United States Patent [19]

Nolt, Jr.

[11] 4,435,448

[45] Mar. 6, 1984

[54] METHOD FOR MANUFACTURING BABBITTED BEARINGS

[75] Inventor: James R. Nolt, Jr., York, Pa.

[73] Assignee: Allis-Chalmers Corporation, Milwaukee, Wis.

[21] Appl. No.: 487,253

[22] Filed: Apr. 21, 1983

[51] Int. Cl.³ .................... B05D 1/36; B05D 3/12; C23C 1/04
[52] U.S. Cl. .................... 427/234; 427/310
[58] Field of Search .................... 427/234, 310

[56] References Cited

U.S. PATENT DOCUMENTS 4,117,580 10/1978 Heck .................... 29/149.5

*Primary Examiner*—James R. Hoffman
*Attorney, Agent, or Firm*—Timothy R. Conrad

[57] ABSTRACT

A method is disclosed for lining a bearing shell with a babbitt metal which does not require tinning of the bearing shell and does not require premelting of the babbitt metal. An inner cylindrical surface of a bearing shell is covered with a flux and lined with a solid babbitt metal. The shell and babbitt metal are rotated about a horizontal axis coaxial with the cylindrical axis of the shell at a rotational velocity sufficient to generate an acceleration at the radially inner surface of said shell of about 20 g's. The babbitt metal and flux are heated to a temperature sufficient to melt the babbitt and the flux and metallic oxides and other impurities at the interface of the babbitt metal and bearing shell are urged toward the axis of rotation permitting a strong metallurgical bond between the babbitt and bearing shell. The shell is cooled and the impurities are machined from the radially inner surface of the babbitt metal.

10 Claims, 2 Drawing Figures

METHOD FOR MANUFACTURING BABBITTED BEARINGS

BACKGROUND OF THE INVENTION

1. Field of the Invention

This invention relates to bearings having a lining of babbitt material. More particularly, this invention relates to a method of lining a bearing shell with babbitt material.

2. Description of the Prior Art

Prior art methods of manufacturing babbitt lined bearings generally call for a cylindrical bearing shell made of steel having an inner cylindrical surface to which a babbitt lining is applied. The cylindrical surface is cleaned with an acid and the clean shell is heated. Once heated, the surface is tinned, for example, by emersing the shell in a tin bath or by spraying tin onto the surface. Once tinned, the bearing shell is rotated about a horizontal axis coaxial with the cylindrical axis of the bearing shell. While the shell is rotating, a molten babbitt metal is poured onto the surface and allowed to cool as the shell rotates. The babbitt solidifies and forms a bond with the layer of tin which in turn is bonded to the steel surface. Rotation is stopped and the babbitt is machined to a final desired thickness.

The above-described method of lining a bearing shell with babbitt metal presents several problems. First, the acid cleaning and tinning procedures are difficult to accomplish properly. For example, a small area of the shell surface may not be adequately cleaned or tinned. In such cases, the babbitt metal does not properly bond to the shell resulting in failure of the bearing at low loadings. Additionally, the cleaning and tinning require several heating steps and frequent handling of the piece. Also, the process requires a good deal of babbitt material to provide enough material for final machining. Commonly, three-quarters of an inch to one inch minium thickness is required following solidification to insure sufficient thickness in valleys formed in the babbitt during cooling.

One method of improving the bond between the babbitt and the shell is to machine a series of dovetailed grooves in the shell which receive the molten babbitt and provide a mechanical bond in addition to the metallurgical bond. However, this method requires costly machining. A method for improving the metallurgical bond between the babbitt and the bearing shell is taught in U.S. Pat. No. 4,117,580 to Heck dated Oct. 3, 1978. The method as taught by Heck consists of lining the bearing surface of the shell with a slurry of tin powder, water and a flux and heating the shell to a temperature sufficient to tin the bearing shell and convert the water to steam. A mixture of water and flux is applied to the layer of the tin on the babbitt shell while the bearing is hot and molten babbitt is poured onto the bearing shell as the shell is rotated about a horizontal axis. The water containing vapor surrounding the shell provides an atmosphere which reduces oxides, such as tin oxides, formed during application of the tin layer. The flux is carried away from the tin during rotation of the bearing shell.

Notwithstanding the improvements made in the prior art, the process for making babbitt lined bearings is still exceedingly expensive in both time and materials. Specifically, the tinning process is expensive and time consuming and carries an inherent possibility of a poorly tinned surface resulting in a poor babbitt bond. Also, the casting of molten babbitt is not easily controlled for desired thicknesses which results in a large amount of finished machining which is required to bring the babbitt lining to its designed thickness. Also, tin oxides which are not fully reduced can cause a poor metallurgical bond between the babbitt and the bearing shell.

OBJECTS AND SUMMARY OF THE INVENTION

It is an object of the present invention to provide a method for manufacturing a babbitted bearing having a strong metallurgical bond between the bearing shell and the babbitt metal.

It is a further object of the present invention to provide a method for manufacturing a babbitted bearing which does not require tinning of the bearing surface prior to applying the babbitt metal.

It is yet another object of the present invention to provide a method for manufacturing a babbitted bearing employing as small amount of babbitt metal as necessary to avoid extensive machining of the babbitt metal following lining of the bearing.

According to a preferred embodiment of the present invention, there is provided a method for manufacturing a babbitted bearing by bonding the babbitt metal directly to an inner cylindrical surface of a bearing shell. The shell to be babbitted is covered with a rosin type flux and a sheet of babbitt metal is rolled to the diameter of the surface to be babbitted. The rolled sheet of babbitt metal is inserted into the shell with its outer cylindrical surface abutting the inner cylindrical surface of the bearing shell. The bearing shell is rotated about a horizontal axis coaxial with the inner cylindrical surface. The shell is rotated until it reaches a rotational velocity sufficient to generate an acceleration force at the cylindrical surface equal to approximately 20 g's. When the shell has reached the proper rotational velocity, it is heated to a temperature sufficient to melt the babbitt material. As the babbitt melts, the flux cleans the surface to provide a good metallurgical bond between the babbitt and the bearing shell. Any oxides which form at the interface between the babbitt and the shell are forced to the inside diameter of the babbitt by reason of the high centrifugal force. The babbitt is then cooled until it has solidified and rotation has stopped. Oxides and flux which have migrated to the inner cylindrical surface of the babbitt lining are machined from the surface and the babbitt lining is machined to its final thickness.

DESCRIPTION OF THE PREFERRED EMBODIMENT

Figure 1:
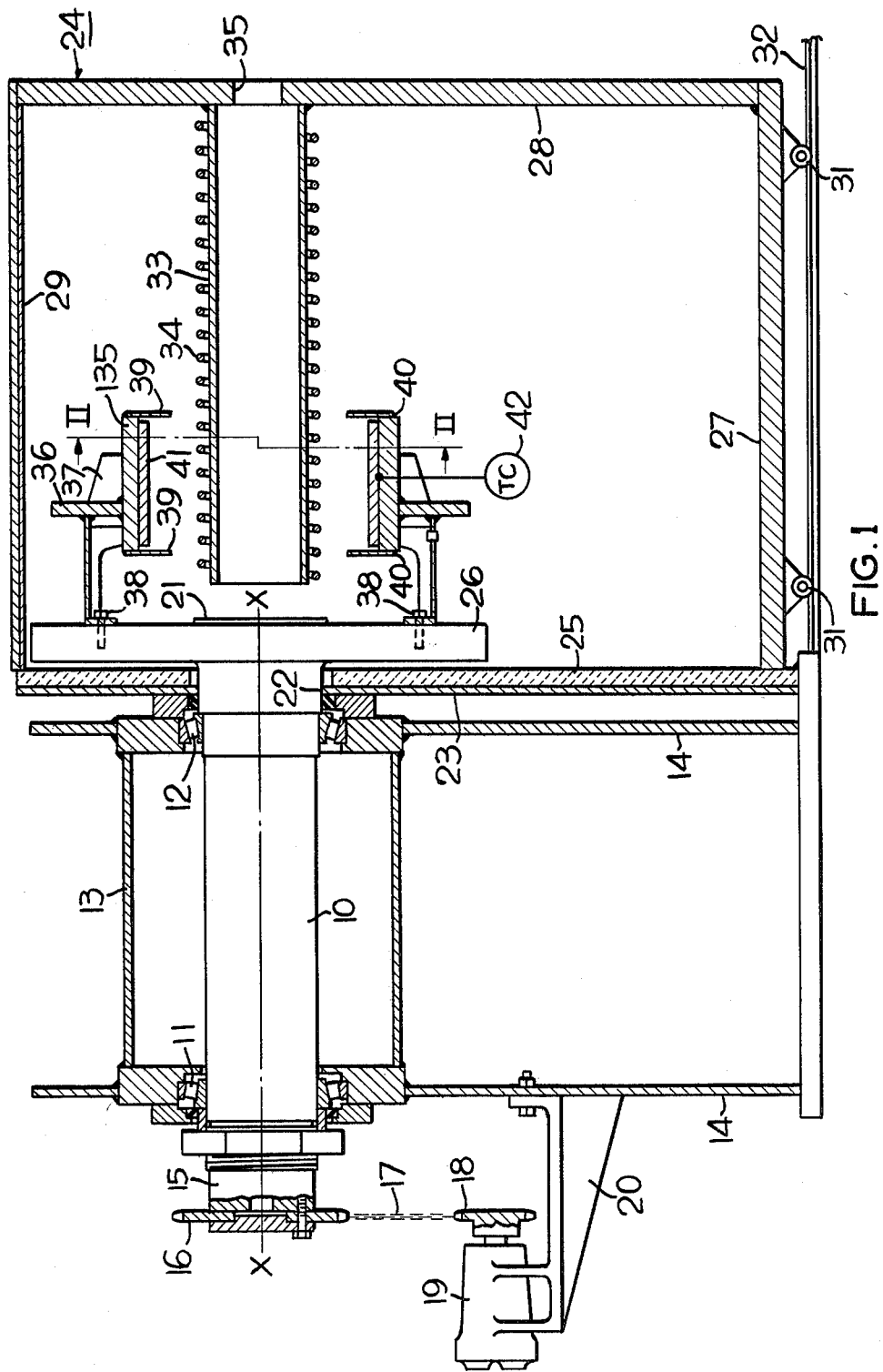
FIG. 1 is a cross-sectional lateral view of an apparatus for centrifugally casting babbitt metal onto a bearing shell.

Referring to FIG. 1, an apparatus for centrifugally casting a babbitt material on a bearing shell is shown in the sectional side view. The apparatus includes a main rotary shaft 10 mounted for rotation about a horizontal axis X—X. The shaft extends through a shaft housing 13 and is supported for rotation within the housing 13 by two sets of bearings 11 and 12. The housing 13 is secured to a foundation by means of leg supports 14. A first end 15 of the shaft extending through the housing 13 is provided with a sprocket 16 which is operably connected by means of a chain 17 to a sprocket 18 contained on a motor 19. The motor 19 is rigidly secured to the support legs 14 of the housing 13 by means of a bracket 20. A second end 21 of the shaft 10 extends through an orifice 22 defined within a forward wall 23 of a furnace 24. The forward wall 23 is provided with a refractory insulating material 25 on an inside of the wall. At the free end 21 of the shaft 10, a mounting flange 26 is provided which is circular and concentric with the axis X—X of the shaft 10.

The casting furnace comprises a box-like structure having a floor portion 27, a back wall 28, and a ceiling portion 29. Side walls connect the ceiling portion 29, floor portion 27, and back wall 28 with the furnace sized, when in the position as shown in FIG. 1, the furnace walls together with the forward wall 23 of the furnace define an enclosed volume sufficiently large to contain the mounting plate of the shaft 10. The floor portion 27 of the furnace is provided with wheels 31 on the exterior of the floor portion 27 which rest upon guide rails 32.

A cylindrical coil support 33 is secured to the back wall 28 and extends toward the front wall 23 coaxial with the shaft 10. A heating coil 34 is wrapped around the exterior surface of the cylindrical support 33. An orifice 35 formed within the back wall 28 coaxial with the cylindrical support provides means for permitting electical cables (not shown) to pass to the heating coil to provide energy for heating the coil 34.

Figure 2:
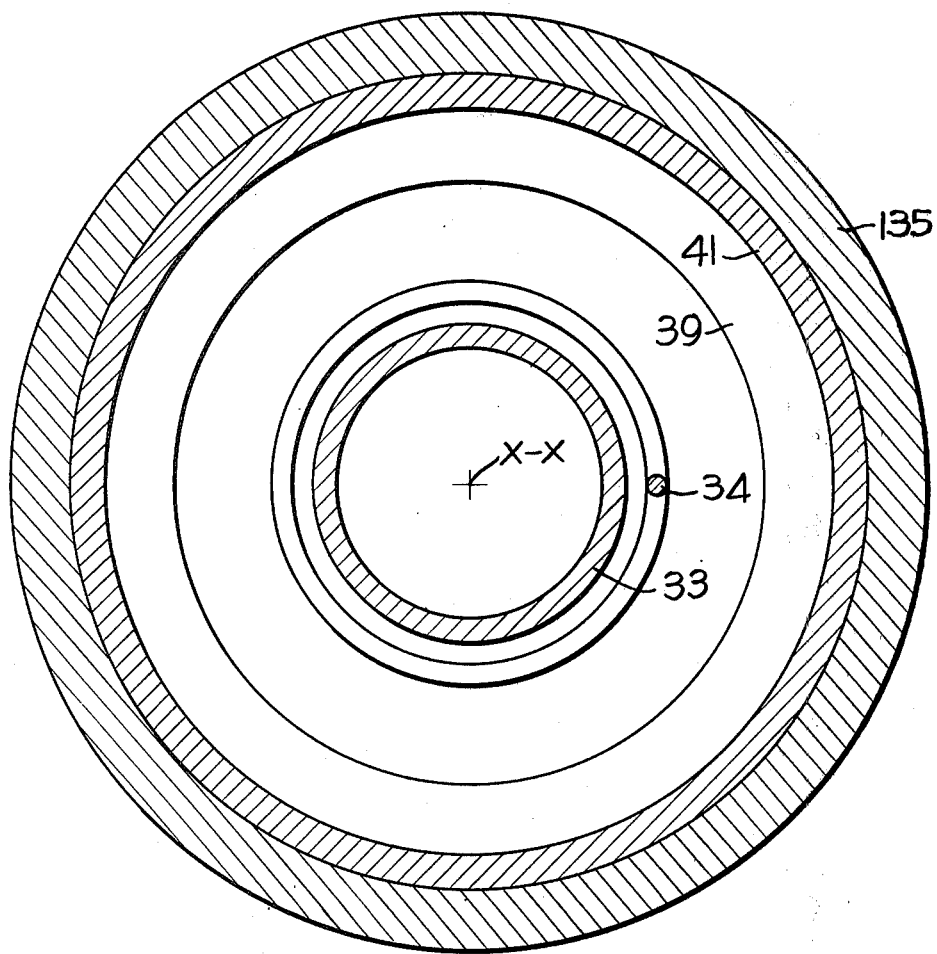
FIG. 2 is a view taken along lines II—II of FIG. 1.

Referring to FIGS. 1 and 2, a cylindrical bearing shell 135 is provided having a radial reinforcing rib 36 extending from the outer cylindrical surface of the bearing shell 135. Brackets 37 secured to the shell 35 and the reinforcing rib 36 are mounted to the mounting plate 26 by means of bolts 38 and hold the bearing shell 135 with its cylindrical axis horizontal and coaxial with the axis X—X of the shaft 10. Annular dams 39 are shown on both ends of the bearing shell 135 and secured to the shell by weldments 40. The annular dams 39 have a radial dimension sufficient to extend beyond the inner surface of the bearing a distance greater than a desired thickness of a babbitt lining to be applied to the inner surface of the bearing. A solid sheet of babbitt material 41 is shown lining the inner cylindrical surface of the bearing shell. A thermocouple (schematically shown at 42) is positioned to sense the temperature of the inner surface of the bearing shell 135.

The preferred method of the present invention will be described by reference to the above described apparatus. A bearing shell 135 to be babbitted is machined to a desired finish on an interior surface to which the babbitt metal is to be applied. Annular dams 39 are lightly welded to the ends of the bearing shell for the purpose of containing a molten babbitt metal. The inner cylindrical surface of the bearing is covered with a rosin type soldering flux.

A sheet of babbitt metal 41 is rolled to the diameter of the inner surface of the bearing at a thickness just greater than the desired final thickness of the babbitt lining for a completed bearing. The rolled sheet of babbitt metal 41 is inserted into the shell with its outer cylindrical surface abutting the inner cylindrical surface of the bearing shell and with the babbitt material extending continuously around the circumference of the bearing shell 135.

The furnace is rolled on wheels 31 to move away from the front wall 23 to expose the mounting plate 26.

The bearing shell 135 is mounted to the mounting plate 26 and the furnace 24 is moved toward the front wall 23 with the apparatus assuming the positions as shown in FIG. 1. The motor 19 is operated to drive the shaft 10 in a rotational motion with the bearing rotating about a horizontal axis X—X. Current is supplied to the heating coil 34 which heats the babbitt metal 41 to a temperature sufficient to melt the babbitt and the flux. The temperature of the inner surface of the bearing is measured by the thermocouple 42 and the temperature is adjusted to prevent the babbitt from heating to a boiling point. As the babbitt and the flux melt, the flux cleans the inner surface of the bearing to permit a metallurgical bond between the babbitt metal and the bearing shell at the inner surface. The bearing is rotated at a sufficient rotational velocity so all impurities (such as flux and metal oxides) at the interface between the babbitt and the bearing shell 135 are forced to the inside diameter of the babbitt metal 41 by reason of the impurities being of a lower density than the babbitt metal 41. After the bearing has rotated for a time sufficient to insure complete melting of the babbitt metal 41, current flow is stopped to the heating coil and the babbitt metal 41 is permitted to solidify. After solidification, rotation of the bearing 135 is stopped and the bearing is removed from the mounting plate 26. The surface of the babbitt metal 41 is then machined to final thickness to remove impurities which have migrated to the inner surface of the babbitt metal 41.

I have found that the above described method for lining a bearing shell with the babbitt metal has provided a bearing of high bond strength between the babbitt metal and the bearing shell. Indeed, for high rotational velocities during the centrifugal casting (such as velocities sufficient to generate an acceleration of 20 g's at the inner surface) the tensile strength of the bond is greater than the tensile strength of babbitt metal. In addition to providing a good bond between the babbitt metal and the bearing shell, the above described method eliminates the need for tinning of the bearing shell prior to applying the babbitt metal. Also, the above described method permits the use of a solid babbitt metal thereby eliminating the need to first melt a babbitt and has the added advantage of wasting less babbitt metal during the casting process since the thickness of a solid babbitt sheet can be easily controlled. Also, I have found that the time for lining a bearing shell with a babbitt metal under the above described method takes approximately 1/10 of the time needed to line a bearing shell under prior art methods.

From the foregoing, it can be seen that the present invention has achieved the objectives of providing a good metallurgical bond while eliminating the need for tinning and premelting of the babbitt metal. Other advantages of the process according to the present invention will be apparent from the hereinafter described example with regard to a specific bearing.

The bearing shell to be lined was a shell of plate steel formed from one inch thick ASTM A 516 grade 60 plate steel having an inner diameter of 28.38 inches. The inner surface of the shell was lined with a rosin type soldering flux (specifically the LA-CO brand regular soldering paste-nonacid as manufactured by the Lake Chemical Company of Chicago, Ill.). A sheet of babbitt metal was rolled to a thickness of one-half inch and having an outer cylindrical dimension equal to the inner cylindrical dimension of the bearing shell. The bearing shell with the inserted solid babbitt metal was rotated about a horizontal axis at a rotation of 223 rounds per minute which generated an acceleration force at the inner cylindrical surface of the bearing shell of approximately 20 g's. While rotating, the bearing was heated to a temperature of about 490° F. to melt the babbitt metal. Preferably the temperature will be no less than 450° F. (representing the approximate melting point of the babbitt metal) and no greater than 600° F. (representing an approximate boiling point of the babbitt metal). After the temperature had reached 490° F., the heating was terminated and the babbitt metal was permitted to cool to 250° F. over a period of approximately one-half hour. After the babbitt metal had cooled to 250° F., rotation was stopped. The babbitt metal used in the above example was ANSI/ASTM B23-73 No. 2 tin based babbitt alloy. The metallurgical bond between the babbitt metal and bearing shell was measured at a tensile strength of 11,750 psi.

While the rotational velocity of the bearing shell during the casting process will vary with the type of babbitt metal and flux employed, preferably the rotational velocity will be sufficient to generate an acceleration force at the interface between the babbitt metal and the bearing shell of approximately 20 g's. Through tests performed, I have determined that the average tensile strength of the bond for an acceleration of 20 g's to be approximately 11,750 psi (indeed at these tests, the bearing did not fail at the interface, instead the babbitt metal failed away from the interface). For rotational velocities generating an acceleration of 9 g's, I have found the average tensile strength of the babbitt to bearing bond to be about 9,738 psi and for a static test where a sheet of babbitt metal was melted on a flat steel plate the tensile strength at the interface was found to be, on average 6,336 psi.

Modifications and equivalents of the disclosed concepts such as readily occur to those skilled in the art are intended to be included in the scope of this invention. Thus the scope of this invention is intended to be limited only by the scope of the claims such as are or may hereinafter be appended hereto.

The embodiments of the invention in which an exclusive property or privilege is claimed are defined as follows:

1. A method for lining an inner surface of a bearing shell with a babbitt metal comprising:
   covering said surface with a flux;
   placing a solid babbitt metal on said covered surface;
   rotating said shell about an axis coaxial with a cylindrical axis of said inner surface;
   heating said babbitt metal and said flux to a temperature sufficient to melt said metal and flux and rotating said shell at a rotational velocity sufficient to urge any impurities at said surface to migrate toward said axis of rotation;
   cooling said shell until said babbitt metal solidifies with said migrated impurities at a radially inner surface of said babbitt metal.

2. A method according to claim 1 wherein said shell is rotated at a rotational velocity sufficient to generate an acceleration at said inner surface of about 20 g's.

3. A method according to claim 2 wherein said axis of rotation is generally horizontal.

4. A method according to claim 3 wherein said impurities are metallic oxides and flux having a density lesser than a density of said babbitt metal.

5. A method according to claim 4 wherein said shell is heated to an approximate temperature between 450° F. and 600° F.

6. A method according to claim 5 wherein said solid babbitt metal placed on said covered surface is a cylindrical sheet of solid babbitt metal sized to have an outer diameter equal to an inner diameter of said inner surface of said bearing shell with said babbitt metal abutting said covered surface.

7. A method according to claim 6 wherein said flux is a rosin type soldering flux.

8. A method according to claim 7 comprising stopping rotation of said cooled shell and removing from said babbitt metal said migrated impurities.

9. A method according to claim 8 comprising removing said migrated impurities by machining said radially inner surface of said babbitt metal.

10. A method according to claim 9 wherein said shell is heated to a temperature of about 490° F.

* * * * *